US012677047B2

(12) United States Patent (10) Patent No.: US 12,677,047 B2
Mou et al. (45) Date of Patent: Jul. 7, 2026

(54) THREE-LIGHT BINOCULARS

(71) Applicant: RAYTRON TECHNOLOGY CO., LTD., Yantai (CN)

(72) Inventors: Daolu Mou, Yantai (CN); Jingmin Li, Yantai (CN); Zhenxue Zhang, Yantai (CN); Xiaoyong Zhang, Yantai (CN)

(73) Assignee: RAYTRON TECHNOLOGY CO., LTD., Yantai (CN)

( * ) Notice: Subject to any disclaimer, the term of this patent is extended or adjusted under 35 U.S.C. 154(b) by 2 days.

(21) Appl. No.: 18/919,452

(22) Filed: Oct. 18, 2024

(65) Prior Publication Data

US 2025/0047959 A1 Feb. 6, 2025

Related U.S. Application Data

(63) Continuation of application No. PCT/CN2022/113061, filed on Aug. 17, 2022.

(51) Int. Cl.
*H04N 23/11* (2023.01)
*H04N 13/122* (2018.01)
(Continued)

(52) U.S. Cl.
CPC ........... *H04N 23/11* (2023.01); *H04N 13/122* (2018.05); *H04N 13/207* (2018.05);
(Continued)

(58) Field of Classification Search
CPC ........................ G02B 2027/0132; H04N 23/11
See application file for complete search history.

(56) References Cited

U.S. PATENT DOCUMENTS 3,582,191 A * 6/1971 Cohen .................. A61B 3/0008
351/205
5,231,535 A * 7/1993 Peters ...................... G02B 7/06
359/414
(Continued)

FOREIGN PATENT DOCUMENTS

CN 203587883 U 5/2014
CN 103926010 A 7/2014
(Continued)

OTHER PUBLICATIONS

International Search Report of PCT Patent Application No. PCT/CN2022/113061 issued on Mar. 30, 2023.
(Continued)

*Primary Examiner* — Clifford Hilaire
(74) *Attorney, Agent, or Firm* — Andrew C. Cheng

(57) ABSTRACT

Three-light binoculars comprises: a binocular barrel, including a visible-light barrel, an infrared barrel, and a laser window; a core assembly, including a visible-light core assembly, an infrared core assembly, and a laser rangefinder; a system-on-chip board, connected to the visible-light core assembly, the infrared core assembly, and the laser rangefinder respectively, for processing and fusing the visible-light images and the infrared images, and receiving the ranging results; a housing, connected to the binocular barrel at its front end and to an eyepiece system at its rear end, forming a space for accommodating the core assembly and the system-on-chip board; and the eyepiece system, including two eyepieces, each of which is provided with a display in signal connection to the system-on-chip board. The three-light binoculars integrate visible-light imaging, high-sensitivity infrared thermal imaging and laser ranging, which can obtain fusion images containing richer information, meet more stringent application requirements.

18 Claims, 10 Drawing Sheets

(51) Int. Cl.
$\quad$ H04N 13/207 $\qquad$ (2018.01)
$\quad$ H04N 13/398 $\qquad$ (2018.01)
$\quad$ H04N 23/12 $\qquad$ (2023.01)
$\quad$ H04N 23/667 $\qquad$ (2023.01)

(52) U.S. Cl.
$\quad$ CPC ........... H04N 13/398 (2018.05); H04N 23/12
$\qquad$ (2023.01); H04N 23/667 (2023.01)

(56) References Cited

U.S. PATENT DOCUMENTS

| | | | | |
|---|---|---|---|---|
| 5,564,817 A | * | 10/1996 | Palmer ................... | F16M 13/02 |
| | | | | 362/191 |
| 6,646,799 B1 | | 11/2003 | Korniski | |
| 2006/0279423 A1 | * | 12/2006 | Nazari ............. | G08B 13/19693 |
| | | | | 340/541 |
| 2012/0098972 A1 | * | 4/2012 | Hansen ................. | H04N 23/45 |
| | | | | 348/E5.09 |
| 2013/0229111 A1 | * | 9/2013 | Nakamura ............. | G02C 11/04 |
| | | | | 315/246 |
| 2015/0066538 A1 | * | 3/2015 | Dantsker ................ | G16H 40/63 |
| | | | | 705/2 |
| 2016/0116730 A1 | * | 4/2016 | McCreight, Jr. ....... | G02B 23/12 |
| | | | | 359/737 |
| 2020/0334848 A1 | * | 10/2020 | Salisbury ................. | F41G 3/02 |

FOREIGN PATENT DOCUMENTS

| | | |
|---|---|---|
| CN | 204667578 U | 9/2015 |
| CN | 106291902 A | 1/2017 |
| CN | 110632751 A | 12/2019 |
| CN | 110741303 A | 1/2020 |
| CN | 112565557 A | 3/2021 |

OTHER PUBLICATIONS

The extended European search report of EP patent application No. 22955294.8 issued on May 6, 2025.

* cited by examiner

10

40

50

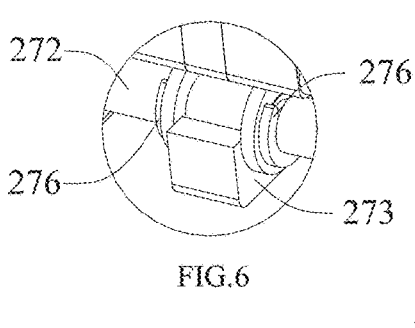
FIG.6
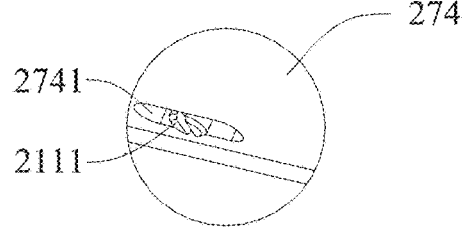
FIG.7
FIG.8

THREE-LIGHT BINOCULARS

FIELD OF THE INVENTION

The present application relates to the technical field of telescope, and in particular to three-light binoculars.

DESCRIPTION OF THE RELATED ART

A telescope is a visual optical instrument used to observe distant objects, which magnifies small field angle of distant objects by a certain factor, resulting in a larger field angle in the image space. This allows objects that are otherwise too small to be seen or distinguished by a naked eye to become clear and distinguishable. Telescopes have numerous and wide-ranging applications.

Telescopes for outdoor use are generally used for outdoor sightseeing and outdoor activities, and are the most common type in all application areas. Marine navigation requires telescopes with excellent waterproof performance and high sealing. Telescopes can be used for forest fire prevention and investigation in forestry. With the continuous expansion of the domestic power grid, the growth of ultra-high voltage lines is rapid. However, many transmission lines are distributed in mountainous areas, resulting in low efficiency, long re-inspection cycles, and low accuracy of inspection data for traditional manual line inspection due to uncertain factors such as terrain environment, personnel quality, and weather conditions. Telescopes are also used in power line inspection. In addition, telescopes are also used in the military and police fields, such as surveying terrain and observing enemy movements. In addition to the most fields covered by the above telescopes, telescopes are also used in water conservancy, railways, and other fields.

Currently, the spectrum of most telescopes on the market is single infrared light, single visible-light, or a combination of infrared light and laser. Due to the many applications of telescopes, such as the application areas listed above, existing single-spectrum products or products of single-spectrum combined with ranging can no longer meet requirements of telescopes in the various extreme and demanding application scenarios and application timing.

SUMMARY OF THE INVENTION

To address existing technical problems, the application provides three-light binoculars, which can obtain images containing richer information including visible-light imaging, infrared thermal imaging and laser ranging, meeting more stringent application requirements.

To achieve the above purpose, the technical solution of this application embodiment is implemented as follows.

Embodiments of the present application provide three-light binoculars, comprising:

a binocular barrel, including a visible-light barrel, an infrared barrel, and a laser window;

a core assembly, including a visible-light core assembly, an infrared core assembly, and a laser rangefinder, the visible-light core assembly receiving visible-lights through the visible-light barrel and generating visible-light images, the infrared core assembly receiving infrared light through the infrared barrel and generating infrared images, the laser rangefinder receiving laser through the laser window and obtaining ranging results by calculation;

a system-on-chip board, connected to the visible-light core assembly, the infrared core assembly, and the laser rangefinder respectively, for processing and fusing the visible-light images and the infrared images, and receiving the ranging results;

a housing, connected to the binocular barrel at its front end and to an eyepiece system at its rear end, forming a space for accommodating the core assembly and the system-on-chip board; and the eyepiece system, including two eyepieces, each of which is provided with a display in signal connection to the system-on-chip board.

In some embodiments, at least one of a battery compartment board, a display power-supply board, a key board, a microphone board, a GPS module, an electronic compass, a WiFi module, and a debugging interface board, is integrated on the system-on-chip board.

In some embodiments, gripping areas in a C-shaped curve are respectively provided on two sides of the housing, and a key area is provided on the housing between the two gripping areas.

In some embodiments, the visible-light core assembly comprises a visible-light lens and a visible-light core, the visible-light lens corresponds to the visible-light barrel, the visible-light core senses lights projected by the visible-light lens and generates visible-light images; the infrared core assembly comprises an infrared lens and an infrared core, the infrared lens corresponds to the infrared barrel, the infrared core senses lights projected by the infrared lens and generates infrared images.

In some embodiments, the core assembly comprises a lens bracket, and the visible-light core and the infrared core are respectively mounted to the lens bracket through a focusing mechanism.

In some embodiments, the focusing mechanism comprises a focusing screw, a focusing screw bracket and a lens flange; the focusing screw is arranged parallel to an corresponding optical axis, the visible-light core and the infrared core are respectively fixedly connected to the corresponding lens flanges, one end of the focusing screw bracket is fixedly connected to the lens bracket, and the other end is rotatably connected to the focusing screw; and the lens flange is threadedly connected to an end of the focusing screw, so that when the focusing screw rotates, the lens flange can move relative to the visible-light lens or the infrared lens along the corresponding optical axis.

In some embodiments, the focusing mechanism comprises an anti-backlash spring, the lens flange is provided with a threaded hole corresponding to the focusing screw, the anti-backlash spring is placed in the threaded hole, and the end of the focusing screw is in contact with the anti-backlash spring.

In some embodiments, the focusing screw bracket is connected to a diameter-reduced portion of the focusing screw, and a snap ring stuck at the diameter-reduced portion is respectively installed to both ends of connection of the focusing screw bracket to the focusing screw, so as to constrain an axial position of the focusing screw at the connection to the focusing screw bracket.

In some embodiments, a positioning guide groove is defined on the lens flange along the corresponding optical axis, and a positioning pin respectively protrudes from the corresponding barrel of the visible-light lens and the infrared lens, and the positioning pins are limited within the corresponding positioning guide groove, so as to allow the lens flanges to move relative to the corresponding lens barrel along the corresponding optical axis.

In some embodiments, the visible-light lens comprises lenses and a dual-bandpass filter, the dual-bandpass filter allows lights of a first bandwidth and a second bandwidth to pass through, the first band is the visible-light bandwidth and the second band is the infrared light bandwidth; and the visible-light core comprises an image sensor and an image processing module, the image processing module being connected to the image sensor to receive image signals sensed by the image sensor;

wherein the three-light binoculars provide a daytime mode and a nighttime mode; in the daytime mode, the image processing module filters images of the second bandwidth lights from the image signals of the image sensor, retaining images of the first bandwidth lights; and in the nighttime mode, the image processing module retains both images of the first bandwidth lights and images of the second bandwidth lights.

In some embodiments, the first bandwidth is in 420~660 nm, the second bandwidth is in 930~970 nm; the dual-bandpass filter has a transmittance of more than 50% for lights of the first bandwidth and a transmittance of more than 85% for lights of the second bandwidth.

In some embodiments, the daytime mode or the nighttime mode is determined by the image processing module on change of light brightness senses by a light sensor, and images of the second bandwidth lights in the image signals received from the image sensor is filtered in the daytime mode.

In some embodiments, an infrared flashlight is detachably mounted to the bottom of the housing, and the infrared flashlight emits infrared lights parallel to the optical axis of the infrared lens after being energized.

In some embodiments, the infrared flashlight (70) is provided with a battery inside, and a 940 nm infrared-light emitting diode is adopted by the infrared flashlight.

In some embodiments, the infrared flashlight is mounted to the housing via a flashlight mounting bracket, the flashlight mounting bracket comprising a clamp and a connecting piece, the clamp being sleeved on periphery of the infrared flashlight, the connecting piece being fixed at one end to the clamp and being locked to the housing at the other end by a fastener.

In some embodiments, the eyepiece system comprises a rear shell, the rear shell is provided with two eyepiece openings, each of the eyepieces is fixed in the corresponding eyepiece opening on the rear shell from the outside by an eyepiece flange, and each of the displays is fixed to the corresponding eyepiece flange.

In some embodiments, the eyepiece system comprises grip rings, the grip ring is connected to the inner side of the corresponding eyepiece flange by threads, and tightness between the eyepiece flange and the eyepiece opening is adjusted by adjusting a mounting position of the grip ring on the eyepiece flange.

In some embodiments, the eyepiece system comprises a guiding block, the guiding block defines a guiding opening with the same shape as the eyepiece opening, the guiding block is disposed in the eyepiece opening; the eyepiece flange extends outward circumferentially to form a baffle, the baffle is larger than the eyepiece opening and abuts against outer side of the rear shell to block the eyepiece opening from the outside and constrain the position of the eyepiece flange; the eyepiece flange is provided with a connecting end, the connecting end passes through the eyepiece opening and the guiding opening threadedly connecting to the grip ring, and the rear end surface of the grip ring is in contact with the corresponding front end surface of the guiding block.

In some embodiments, the guiding block is made of self-lubricating wear-resistant material, and the side wall of the grip ring is provided with a locking opening, so that a locking pin can be inserted into the locking opening and abut against wall of the connecting end.

In some embodiments, the outer side of the rear shell is provided with scale marks, the scale marks are located between the eyepiece openings, and adjacent scale lines of the scale mark are equally spaced, to indicate moving distances of the eyepiece flange and the eyepiece relative to the rear shell.

The embodiments of the present application provide three-light binoculars with at least the following beneficial effects: The present application provides three-light binoculars that integrates visible-light imaging, high-sensitivity infrared thermal imaging and laser ranging, which can obtain fusion images containing richer information, meet more stringent application requirements, and can be used as a portable handheld telescope of binocular three-light suitable for all scenarios such as outdoor exploration, hunting, field safety protection and etc.

The three-light binoculars of the present application have functions of manual focusing for both visible-light lens and infrared lens. Focusing is achieved by adjusting the relative positions of the core (visible-light core, infrared core) and the lens (visible-light lens, infrared lens). By rotating the knob with a finger, the focusing screw rotates simultaneously. The rotation of the focusing screw drives the lens flange and the core to move relative to the lens, thereby achieving focusing. By canceling lens focusing from the internal, the lens structure is simplified, and the weight is reduced. The entire functional structure does not require additional space in the overall machine. The positions requiring sealing in the functional mechanism can be achieved with ordinary sealing rings. During use, focusing can be completed with a single finger, which is very convenient.

The three-light binoculars of the present application have function of adjusting pupil distance. By fixing the eyepiece to the eyepiece flange and adding a guide block, the pupil distance can be adjusted. The pupil distance adjustment can be achieved by adjusting the tightness through the guide block and the grip ring. The structure is simple for assembling, does not require screw fastening, and does not have complex parts. The overall shape of the three-light binoculars is not restricted, allowing for different designs without affecting the internal spatial layout. This provides more space to add other functional components. By installing a sealing ring on the eyepiece flange, the entire product can be sealed, providing a high sealing level.

The three-light binoculars of the present application have functions of day and night dual-use. It utilizes a dual-bandpass filter to replace the IR-CUT dual filter switcher. In the daytime mode, the image processing module filters out infrared lights to obtain a clearer image. In the nighttime mode, infrared lights can be sensed to obtain lower illumination. It features high cost-effectiveness, small size, simple structure, and high stability. It can enhance the effect of nighttime color imaging and ensure optical imaging quality. To further enhance nighttime color imaging, an infrared flashlight can be used simultaneously to enhance light intensity. Image processing algorithms can be further used to optimize the visible-light imaging effect, improving the visible-light nighttime color imaging effect and ensuring optical imaging quality.

BRIEF DESCRIPTION OF THE DRAWINGS

FIG. 6 is an enlarged of part I of FIG. 5.

FIG. 7 is an enlarged view of part II in FIG. 5.

FIG. 8 is a schematic diagram of a disassembled structure of the core assembly in FIG. 5.

The component labels in the figures are as follows:

Figure 1:
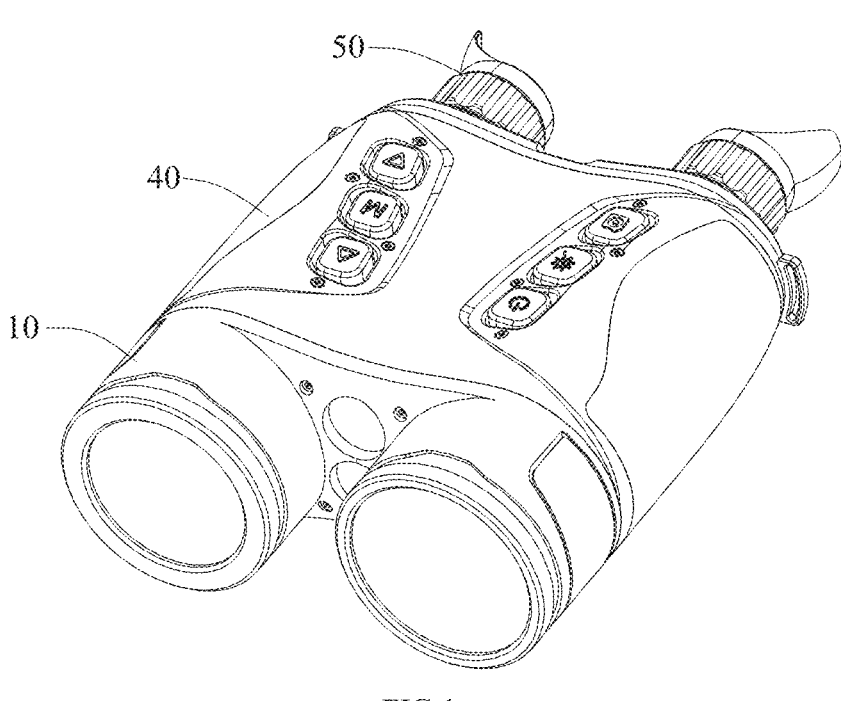
FIG. 1 is a schematic diagram of a stereoscopic view of three-light binoculars in one embodiment of the present application.

binocular barrel 10 (visible-light barrel, infrared barrel 12, connecting plate 13, laser window 14);

core assembly 20 (visible-light lens 21, infrared lens 22, visible-light core 23, infrared core 24, laser rangefinder 25, lens bracket 26, focusing mechanism 27; lens barrel 211, lens 212, dual-bandpass filter 213, spacer ring 214, sealing ring 215, pressing ring 216; positioning pin 2111; knob 271, focusing screw 272, focusing screw bracket 273, lens flange 274, anti-backlash spring 275, snap ring 276; positioning guide groove 2741);

system-on-chip board 30 (battery compartment board 31, display power-supply board 32, key board 33, microphone board 34, GPS module 35, electronic compass 36, WiFi module 37, debugging interface board 38, interface 39);

housing 40 (grip area 41, key area 42);

eyepiece system 50 (rear shell 51, eyepiece 52, eyepiece flange 53, sealing ring 54, display 55, screen pressure block 56, guiding block 57, grip ring 58; eyepiece opening 511, scale mark 512; baffle 531, connecting end 532; guide opening 571);

battery compartment 60 infrared flashlight 70;

flashlight mounting bracket 80 (clamp 81, connecting plate 82);

three-light binoculars 100.

EMBODIMENTS OF THE INVENTION

The following is a further detailed description of the technical solution of the present invention in conjunction with the drawings of the specification and specific embodiments.

Unless otherwise defined, all technical and scientific terms used herein have the same meaning as understood by those skilled in the art of the technology pertaining to the present invention. The terms used in the description of the present invention herein are only intended to describe specific embodiments, not to limit the scope of the present invention. The terminology "and/or" used herein include any and all combinations of one or more of the listed items.

In the description of the present invention, it is necessary to understand that the terms "top", "on", "below", "front", "back", "left", "right", "vertical", "horizontal", "top", "bottom", "inner", "outer", and other directional or positional relationships indicated thereby are based on the directional or positional relationships shown in the drawings, only for the purpose of facilitating the description of the present invention and simplifying the description, rather than indicating or implying that the device or component must have specific orientations, or be constructed and operated in specific orientations, and therefore should not be understood as limiting the present invention. In the description of the present invention, unless otherwise stated, the term "multiple" or "plurality" means two or more.

In the description of the present invention, it should be noted that unless otherwise expressly specified and limited, terms such as "installation", "connection," and "linking" should be understood in a broad sense, for example, they can be fixed connections, detachable connections, or integral connections; they can be directly connected or indirectly connected through an intermediate medium, and can be interconnections within two components. For one skilled in the art, the specific meanings of the above terms in the present invention can be understood under specific circumstances.

Infrared detectors can not only acquire target information in a scene, but also effectively display hidden thermal targets, unaffected by day or night, or by adverse weather conditions. However, they are affected by factors such as the radiation characteristics of the scene, the system operating wavelength, transmission distance, and atmospheric attenuation, resulting in low contrast in infrared images, strong spatial correlation, and poor target detail reflection capability. Visible-light detectors, on the other hand, can compensate for the low contrast and poor target detail reflection capability of infrared detector output images. However, CCD (Charge Coupled Device) detectors typically acquire target information in a scene "passively," and the image quality obtained in darkness or under adverse weather conditions is poor. Infrared images can compensate for these shortcomings of visible-light images.

Based on the above research results, the present application provides three-light binoculars that use visible-light imaging and infrared imaging to obtain fused images, and simultaneously provides laser ranging. The final comprehensive images obtained contains visible-light information, infrared information, and laser ranging information. Image fusion of infrared and visible-light merges the information of the infrared image and the visible-light image of the same scene into a fused image, and after combining the ranging information, a comprehensive image containing more information is obtained, which is more suitable for visual observation by human eyes and information extraction by computers.

Figure 2:
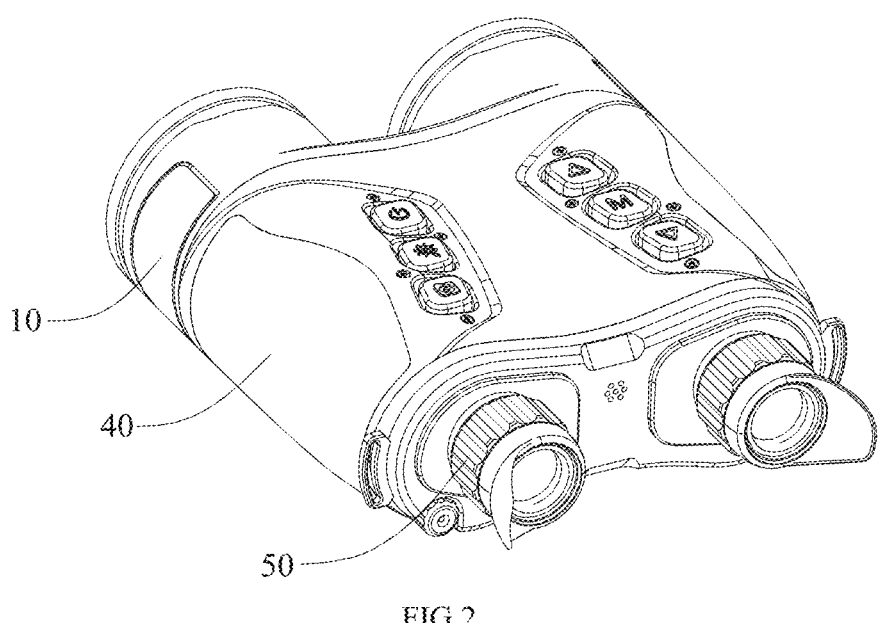
FIG. 2 is a schematic diagram of another stereoscopic view of the three-light binoculars in FIG. 1.
Figure 3:
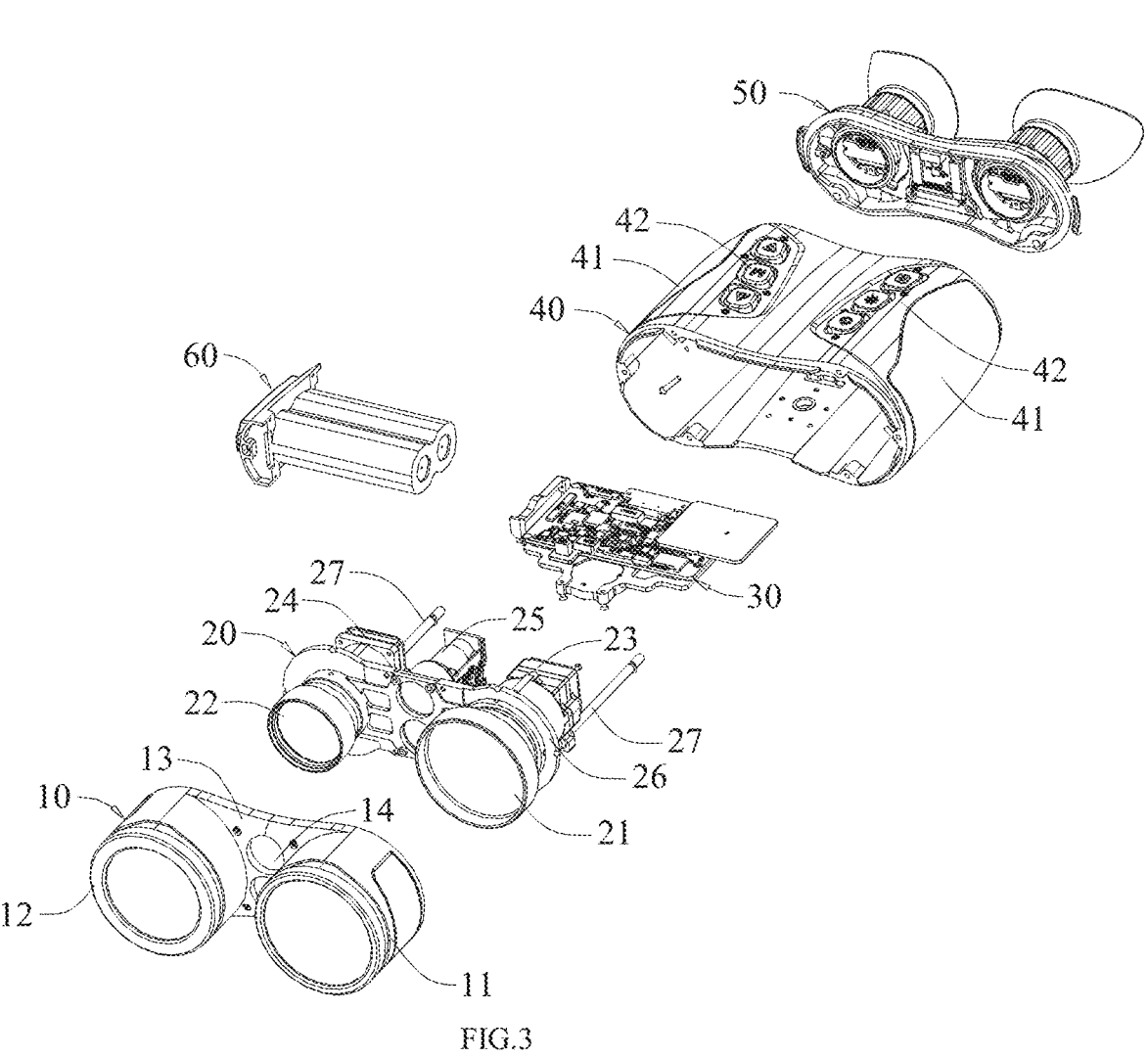
FIG. 3 is a schematic diagram of a disassembled structure of the three-light binoculars in FIG. 1.

Referring to FIG. 1, FIG. 2 and FIG. 3, schematic diagrams of three-light binoculars 100 in this embodiment are provided. The three-light binoculars 100 include a binocular barrel 10, a core assembly 20, a system-on-chip board 30, a housing 40, and an eyepiece system 50. The binocular barrel 10, housing 40, and eyepiece system 50 are sequentially connected to fix the core assembly 20 and the system-on-chip board 30 within the formed space.

The binocular barrel 10 comprises a visible-light barrel 11 and an infrared barrel 12. The visible-light barrel 11 and the infrared barrel 12 are connected by a connecting plate 13 into an integration. A laser window 14 is provided on the connecting plate 13 for emitting and receiving reflected range finding laser. The laser window 14 can be located between the visible-light barrel 11 and the infrared barrel 12, utilizing the space between the visible-light barrel 11 and the infrared barrel 12 to make the overall structure more compact.

The core assembly 20 includes a visible-light lens 21, an infrared lens 22, a visible-light core 23, an infrared core 24, a laser rangefinder 25, and a lens bracket 26. The visible-light lens 21 and the infrared lens 22 are fixed to the lens bracket 26, and the lens bracket 26 is fixed in the housing 40, so that the visible-light lens 21 and the infrared lens 22 correspond to the visible-light barrel 11 and the infrared barrel 12 on the binocular barrel 10, respectively. The laser rangefinder 25 is mounted on the lens bracket 26 between the visible-light lens 21 and the infrared lens 22, so that the laser emission of the laser rangefinder 25 is directed towards the laser window 14 on the binocular barrel 10, thus enabling the emission of ranging lasers outwards and the reception of reflected feedback lasers.

Corresponding to the visible-light lens 21, the visible-light core 23 is mounted on the lens bracket 26 through a focusing mechanism 27; and corresponding to the infrared lens 22, the infrared core 24 is mounted on the lens bracket 26 through another focusing mechanism 27. The visible-light core 23 is used to sense visible-lights focused thereon through the visible-light lens 21 and generate visible-light images; and the infrared core 24 is used to sense infrared lights focused thereon through the infrared lens 22 and generate infrared images.

The system-on-chip board 30 includes a SOC (System on Chip), which is used to centralized control the electronic components within the three-light binoculars 100 and serves as the carrier for software functions of the entire product, connected to the core assembly 20 via an FPC flexible flat cable. The system-on-chip board 30 has an image processing chip. The visible-light core 23, infrared core 24, and infrared rangefinder 25 are connected to the system-on-chip board 30. The system-on-chip board 30 fuses a visible-light image and an infrared image to obtain a fused image, and combines the ranging results to obtain a comprehensive image containing visible-light information, infrared information, and ranging information. The system-on-chip board 30 outputs comprehensive images, which are superpositions of the laser ranging results with visible-light images, infrared images, or fused images, to a display 55 for display. Menus and other software functions on the system-on-chip board 30 can be further superimposed with the comprehensive images and then output to the display 55 for display.

The three-light binoculars 100 has 3 image modes, a visible-light image mode, an infrared image mode, and a fused image mode, via the system-on-chip board 30. The visible-light mode is used during the day, the infrared mode is used at night, and the fused mode can be used for all-weather condition, addressing the shortcomings of single-type telescopes.

Figure 4:
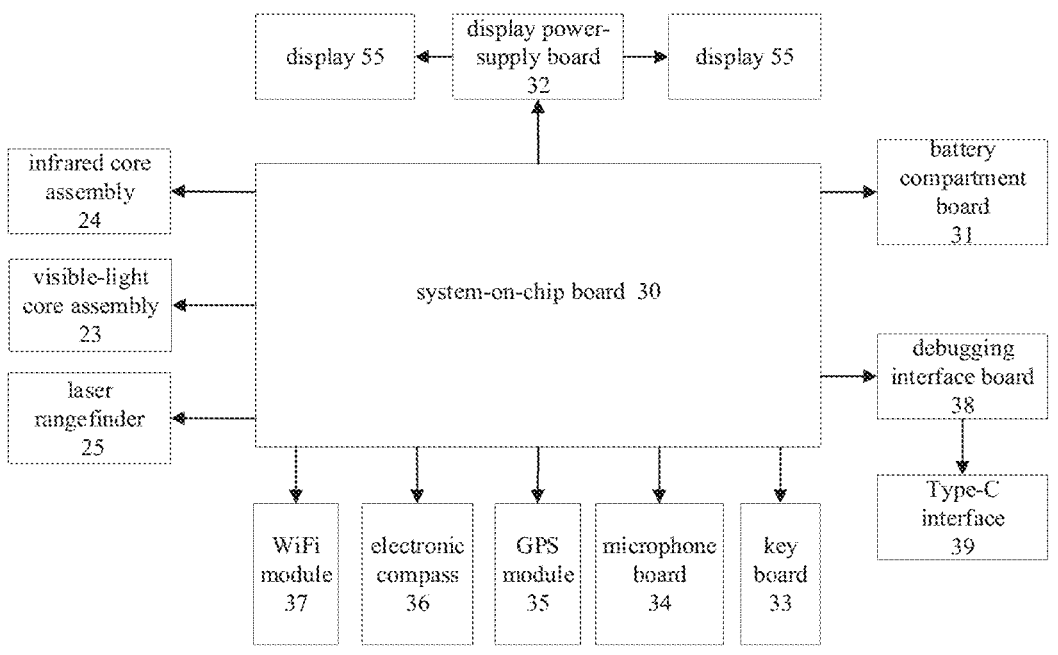
FIG. 4 shows a schematic diagram of the connection relationship of the system-on-chip board in FIG. 3.
Figure 5:
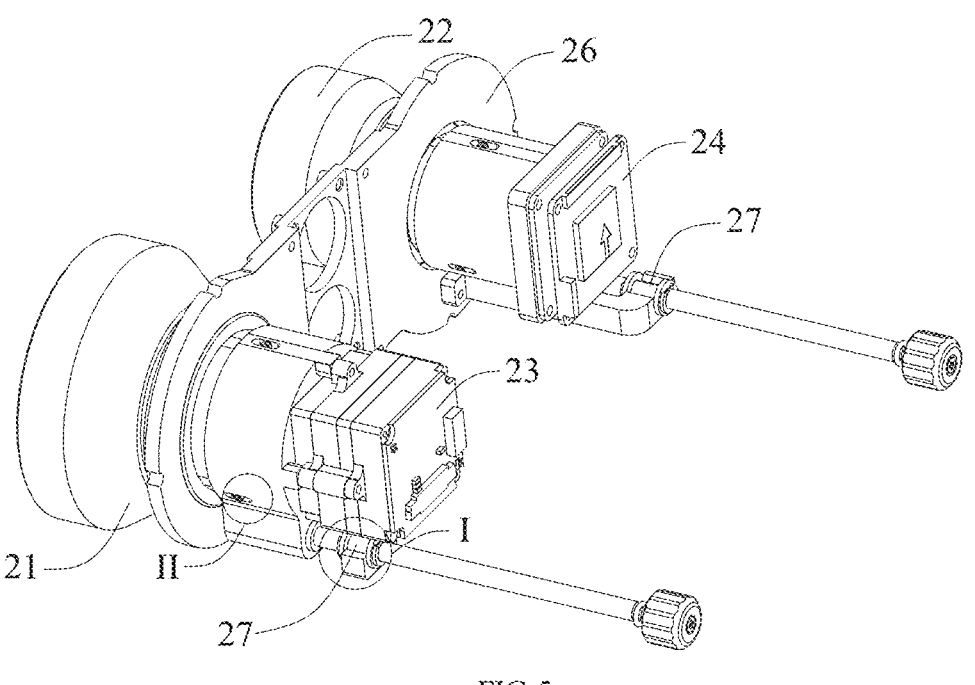
FIG. 5 is a schematic diagram of another stereoscopic view of the core assembly in FIG. 3 after removing the laser rangefinder.

Referring to FIG. 4, the system-on-chip board 30 provides various external interfaces, integrating a battery compartment board 31, a display power-supply board 32, a key board 33, a microphone board 34, a GPS module 35, an electronic compass 36, a WiFi module 37, and a debugging interface board 38. Therein, the battery compartment board 31 connects to the battery compartment 60 and is used to control the charging and discharging of the battery compartment 60, the display power-supply board 32 connects to the display 55 in the eyepiece system 50 and is used to control the information displayed on the display 55, and the key board 33 can realize human-computer interaction functions. In the illustrated embodiment, corresponding to the two key areas 42 on the housing 40, there are two key boards at the left and the right with a total of 6 keys. The left key board 33 includes a power key, a laser key, and a photo key, and the right key board 33 includes a menu key and 2 direction keys. The microphone board 34 connects to the microphone (not shown) and is used to process sound signals picked up by the microphone. The GPS module 35 provides GPS navigation and orientation functions for the three-light binoculars 100. The electronic compass 36 can provide north-south guidance function, which is convenient for outdoor use. The WiFi module 37 provides wireless signal transmission and reception functions. By mobile phone APP and other interconnection functions, remote view at a certain distance can be realized under WiFi interconnection functions. The debugging interface board 38 is used to provide an interface for connecting to external devices. For example, the debugging interface board 38 can connect to an interface 39, and through the interface 39, connect to the corresponding interface type (such as Type-C, Mini USB, etc.) data cable for power supply, data export, firmware update, PAL video output, etc., which reduces the use difficulty of users.

Based on the system-on-chip board 30 and internal hardware, the three-light binoculars 100 can realize many software functions, providing convenient and rich user experience. The functions that the three-light binoculars 100 can achieve through the system-on-chip board 30 include but are not limited to: power on/off; image mode switching function (visible light image, infrared image, fusion image); display brightness adjustment; brightness and contrast adjustment of visible-light and infrared image; picture-in-picture function; infrared hotspot tracking function; infrared image polarity adjustment function; infrared image enhancement function; infrared image correction function; status icon display function; electronic zoom of visible-light image, infrared image, and fusion image; electronic compass, GPS positioning and navigation function; laser ranging information display; photo, video recording and file management, playback and deletion; storage card formatting; WiFi real-time transmission; mobile phone APP interconnection; power display and undervoltage indication; system time display and setting; recording; restoring system settings; and system information viewing.

Referring to FIG. 5 to FIG. 8, the focusing mechanism 27 includes a knob 271, a focusing screw 272, a focusing screw bracket 273, and a lens flange 274. The lens flange 274 can move relative to the corresponding visible-light lens 21 and the infrared lens 22 along the corresponding optical axis. The visible-light core 23 and infrared core 24 are mounted in the lens flanges 274, and are fixedly connected to the corresponding lens flange 274, respectively. The focusing screw 272 is provided parallel to the corresponding optical axis. One end of the focusing screw 272 is rotatably mounted on a rear shell 51 of the eyepiece system 50 fixed to the housing 40, and the other end is rotatably mounted on the focusing screw bracket 273 fixed to the lens bracket 26, thereby the focusing screw 272 being rotatably mounting in the housing 40. The knob 271 is fixed to the end of the focusing screw 272 protruding from the rear shell 51, and the lens flange 274 is threadedly connected to the other end of the focusing screw 272.

As shown in FIG. 6, the focusing screw bracket 273 is connected to a diameter-reduced portion of the focusing screw 272, and snap rings 276 are installed at both ends for limiting. 2 snap rings 276 cooperate with the focusing screw bracket 273 to limit the movement of the focusing screw 272, constraining the focusing screw 272 at the connection with the focusing screw bracket 273, so as to prevent axial movement of the focusing screw 272 during rotation.

The focusing mechanism 27 also includes an anti-backlash spring 275. A threaded hole corresponding to the focusing screw 272 is provided on the lens flange 274. The anti-backlash spring 275 is placed in the threaded hole, and the front end of the focusing screw 272 abuts against the anti-backlash spring 275. When the external thread of the focusing screw 272 mates with the internal thread of the lens flange 274, the gap between the internal and external threads is eliminated by the anti-backlash spring 275. The elasticity of the anti-backlash spring 275 adjusts the displacement of the lens flange 274 relative to the focusing screw 272, ensuring the accuracy of focusing. Taking the focusing of the visible-light lens 21 as an example, when the knob 271 is rotated with a finger, the focusing screw 272 rotates with the knob 271. The rotation of the focusing screw 272 drives the lens flange 274, which is connected to the focusing screw 272 by threads, to move relative to the focusing screw 272. The visible-light module 23 moves together with the lens flange 274 along the focusing screw 272, causing the distance between the visible-light core 23 and the visible-light lens 21 in the optical axis to change, thereby achieving focusing adjustment. As shown in FIG. 7, a lens barrel 211 of the visible-light lens 21 is provided with 3 positioning pins 2111 (evenly distributed around the circumference) at the connection with the lens flange 274. The 3 positioning pins 2111 are limited in corresponding 3 positioning guide grooves 2741. The guide grooves 2741 are provided along the optical axis to guide the moving direction of the lens flange 274, thereby ensuring that the visible-light core 23 can only move parallel to the optical axis under guidance and limitation of the guide grooves 2741 and cannot rotate relative to the visible-light lens 21.

Similarly, by rotating the knobs 271 corresponding to the infrared lens 22 and the infrared core 24 with a finger, the focusing screw 272 rotates together to drive the lens flange 274 and the infrared core 24 to move, thereby achieving the function of focusing.

The housing 40 is designed as a C-shaped curved body for gripping, imitating the way a human hand holds an object, i.e., gripping areas 41 on both sides of the housing 40 are C-shaped curves for easy gripping. Under normal relaxed conditions, the human hand generally presents five basic positions in the form of C: central, ulnar deviation, radial deviation, dorsal deviation, and palmar flexion. The central form is the natural position of a hand, where the wrist is optimally stressed. The C-shaped curve ensures that the hand, the product, and the key area 42 are all kept in the middle, and the wrist remains straight and preventing pressure on the palm. Moreover, the height of the keys in the key area 42 conforms to the arc of the human hand grip, and the size and shape of the keys are close to the shape of the user's fingers, providing a comfortable feel and reducing misoperation. The gripping area 41 can be provided with an overgrip with a textured surface to increase the friction between the palm and the product, thereby achieving anti-skidding.

Figure 9:
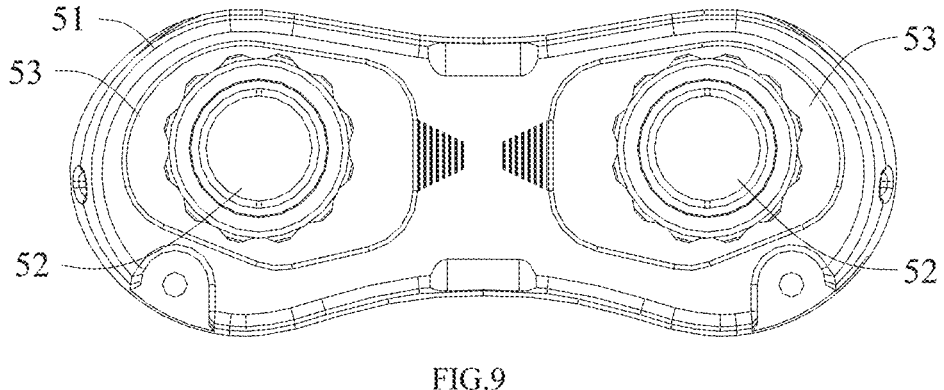
FIG. 9 is a schematic diagram of the front view of the eyepiece system in FIG. 3.
Figure 10:
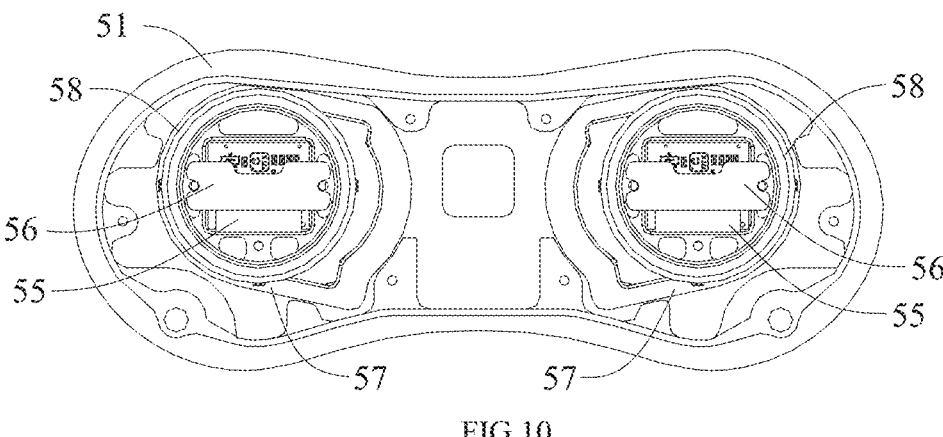
FIG. 10 is a schematic diagram of the rear view of the eyepiece system in FIG. 3.
Figure 11:
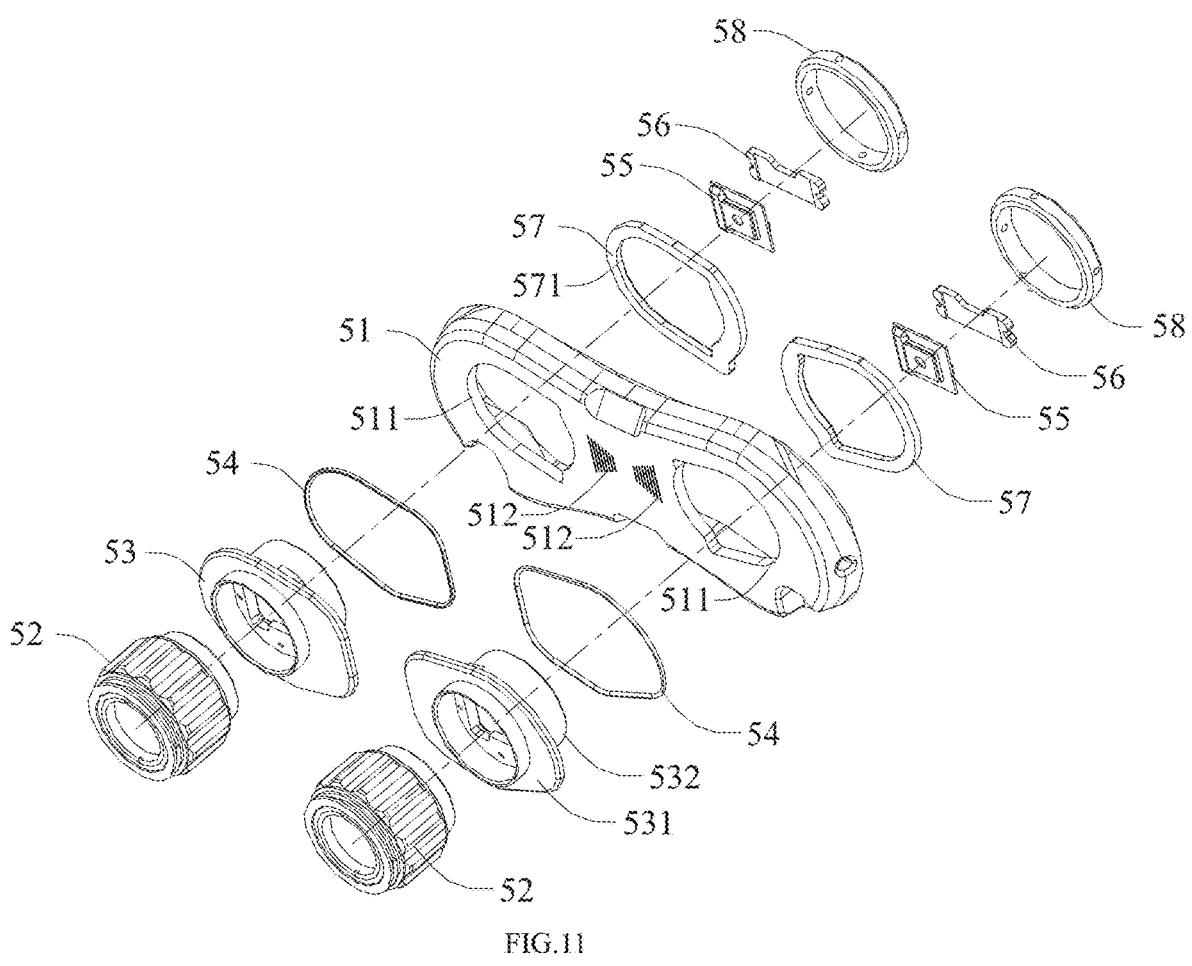
FIG. 11 is a schematic diagram of the disassembled structure of the eyepiece system in FIG. 9.

Refer to FIG. 9 to FIG. 11, the eyepiece system 50 includes a rear shell 51 fixed to the housing 40. Two sets of eyepieces 52 are mounted on the rear shell 51. Each of the eyepieces 52 is mounted in the corresponding eyepiece opening 511 on the rear shell 51 from the outside, through an eyepiece flange 53 and a sealing ring 54. The inner side of the eyepiece flange 53 is locked by a guide block 57 and a grip ring 58. The display 55 corresponding to the eyepiece 52 is fixed to the eyepiece flange 53 by a display pressing block 56 and is located in front of the eyepiece 52.

Specifically, the eyepiece flange 53 extends outward circumferentially to form a baffle 531. The baffle 531 is larger than the eyepiece opening 511 and abuts against the outer side of the rear shell 51, thereby blocking the eyepiece opening 511 and constraining the eyepiece flange 53 in the front-to-back direction. The guiding block 57 defines a guiding opening 571 with the same shape as the eyepiece opening 511, and the guiding opening 571 is located inside the eyepiece opening 511. A connecting end 532 at the front end of the eyepiece flange 53 passes through the eyepiece opening 511 and the guiding opening 571 and is threadedly connected to the grip ring 58. The rear end surface of the grip ring 58 contacts the front end surface of the guiding block 57. As the baffle 531 of the eyepiece flange 53 and the grip ring 58 are located on the inner and outer sides of the rear shell 51 respectively, the position of the grip ring 58 on the eyepiece flange 53 can be adjusted by threading, thereby adjusting the tightness between the eyepiece flange 53 and the rear shell 51. This allows the eyepiece flange 53 to drive the eyepiece 52 to move in the eyepiece opening 511, achieving pupillary distance adjustment and ensuring the visual effect after pupillary distance adjustment. The grip ring 58 can also define locking holes on its side wall. A locking pin can be inserted into the locking holes to abut against the wall of the connecting end 532, preventing the grip ring 58 from rotating. This locks the grip ring 58 in place on the connecting end 532, preventing it from loosening after the interpupillary distance adjustment is completed. The outer side of the rear shell 51 is provided with scale marks 512, which are located between the two eyepiece openings 511. The scale marks 512 are used to indicate the current position and moving distance of the eyepiece flange 53 (and the eyepiece 52 therein). For example, the interval between adjacent scale lines of scale marks 512 can be set to 1 mm. The distance between the two eyepieces 52 can be adjusted by moving the eyepiece flange 53 in the direction of the arrow, with a moving distance of one scale line as a reference, corresponding to a movement of 1 mm of the eyepiece 52. It allows to adapt with different interpupillary distances for users, enabling users to achieve optimal visual effects. As the eyepiece 52 and the corresponding display 55 are mounted together on the eyepiece flange 53, when the distance between the two eyepieces 52 is adjusted by moving the eyepiece flanges 53, the eyepiece flanges 53 drives the displays 55 to move along the guiding openings 571 respectively. This ensures that the center of the displays 55 remain aligned with the corresponding optical axis of the eyepieces 52, preventing the images from exceeding the eyepiece viewing range due to interpupillary distance adjustment.

The guiding block 57 can be made of materials such as PTFE (polytetrafluoroethylene), which has wear-resistance, self-lubrication and other characteristics, ensuring reliability. The interpupillary distance adjustment can be achieved by the guiding block 57 and the grip ring 58, and the structure is simple to assemble.

Figure 12:
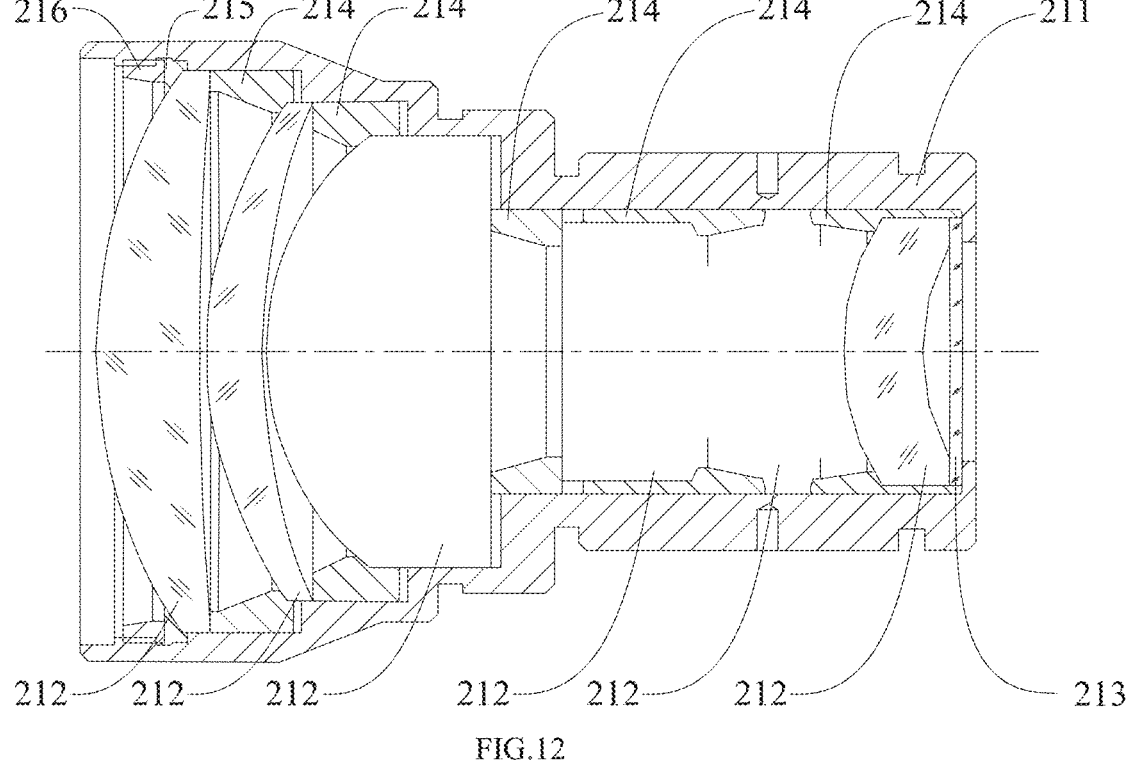
FIG. 12 is an axial cross-section of the visible-light lens in FIG. 8.
Figure 13:
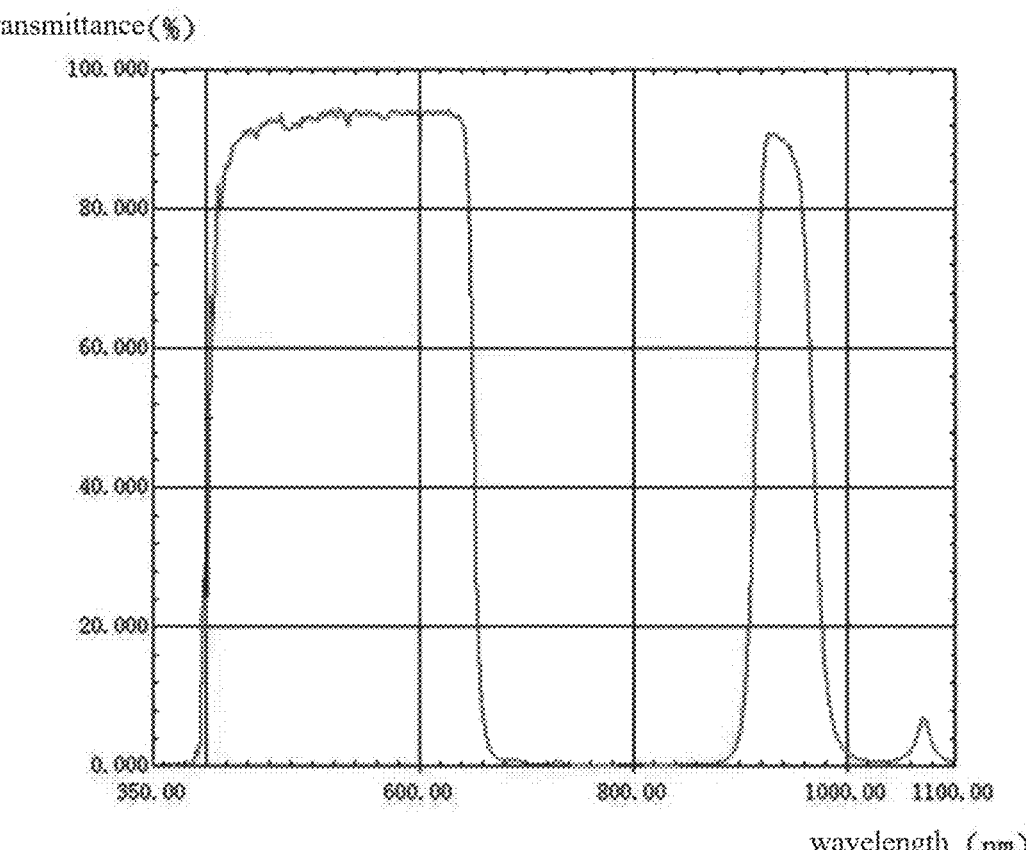
FIG. 13 shows the passband diagram of the dual-bandpass filter in FIG. 12.

The battery compartment 60 is installed with batteries to power the entire product, in the illustrated embodiment. The battery compartment 60 is installed with 2 batteries of 18650 mAh. In addition, the three-light binoculars 100 can also be powered by an external data cable via the interface 39. The type of interface 39 is not limited to the Type-C and Mini USB mentioned above, and can also include two or more types according to the needs. To obtain a lower illuminance, in addition to capturing visible lights, the visible-light core 23 also needs to capture some infrared lights. However, capturing infrared lights of different wavelengths will have a certain impact on visible light imaging. Therefore, a filter that can filter out unnecessary infrared light while retaining the required infrared light is required. Usually, an IR-CUT dual filter is used. A set of filters is built into the camera lens group. When the infrared sensing point out of the lenses detects changes in the intensity of lights, the built-in IR-CUT dual filter switcher can automatically switch according to the intensity of external lights, so that the visible light image achieves the best effect. Due to the implementation of the IR-CUT dual filter switcher requiring a microelectronic motor, driving circuits and mechanism, and two or more optical filters, which presents significant implementation difficulties and higher costs, it leads to an increase in product size, weight, power consumption, and cost-effectiveness. Referring to FIG. 12 and FIG. 13. The visible-light lens 21 includes a lens barrel 211, lenses 212 and a dual-bandpass filter 213 disposed in the lens barrel 211. Multiple lenses 212 and the dual-bandpass filters 213 are arranged along the optical axis. A spacer rings 214 is provided between adjacent lenses 212, and between the lens 212 and the dual bandpass filters 213 for isolation. The lens 212 at the front is equipped with a sealing ring 215 and a pressing ring 216, which seals the lens 212 in the lens barrel 211. Multiple lenses 212 form a lens group to focus the lights and transmit through the lenses. The dual-bandpass filter 213 filters the lights from the lens 212 at the front, to be transmitted to the visible-light core 23.

The dual-bandpass filter 213 is a single filter with two passing bands. Only one filter is used to capture two specific bands, and two or more bands in the region can be selected to pass therethrough. Referring to FIG. 13, the dual-bandpass filter 213 allows partial band of visible light (a first band) and partial band of infrared light band (a second band) to pass through. The first band is the visible light band of 420-660 nm, with a transmittance T of over 50%; and the second band is the infrared band 930-970 nm, with a transmittance T of over 85%. The dual-bandpass filter 213 achieves dual bandpass by coating. The detailed coating requirements for the dual-bandpass filter 213 are as follows:

420~620 nm: minimum transmittance $Tmin \geq 85\%$, average transmittance $Tave \geq 90\%$;

650+10 nm: transmittance T=50%;

700~850 nm: transmittance T<3%;

930~970 nm: transmittance T>85%;

1100~1200 nm: maximum transmittance $Tmax \leq 4\%$.

A dual-bandpass filter 213 filters the lights entering the visible-light core 23, allowing visible lights and infrared lights of specific wavelengths to pass through.

The visible-light core 23 includes an image sensor and an image processing module. The image processing module receives image signals output by the image sensor in real time and processes the image signals transmitted from the image sensor, such as white balance processing, exposure processing, and color correction. The dual-bandpass filter 213, together with the image processing module integrated in the visible light core 23, enables dual-bandpass switching to adapt to a daytime mode and a nighttime mode.

Specifically, in the daytime mode (when used during the day), lights of both the first band (650 nm band range) and the second band (940 nm band range) pass through the dual-bandpass filter 213 and are sensed by the image sensor. After receiving the image signals, the image processing module filters out the lights of the second band using image algorithms, retaining only the images of the lights of the first band. This prevents the lights of the second band from affecting the color reproduction accuracy of the images. In the nighttime mode (when used at night), the lights of the first band are almost nonexistent at night. Therefore, only the lights of the second band pass through the dual-bandpass filter 213. When processing the received image signals, the image processing module does not filter out the images of the lights of the first band.

The image processing module can determine whether external scene is a daytime scene or a nighttime scene by sensing the changes of brightness of the lights in external scene by the light sensor, and thus determine whether to filter out the light of the second band in the image signals received from the image sensor.

Figure 14:
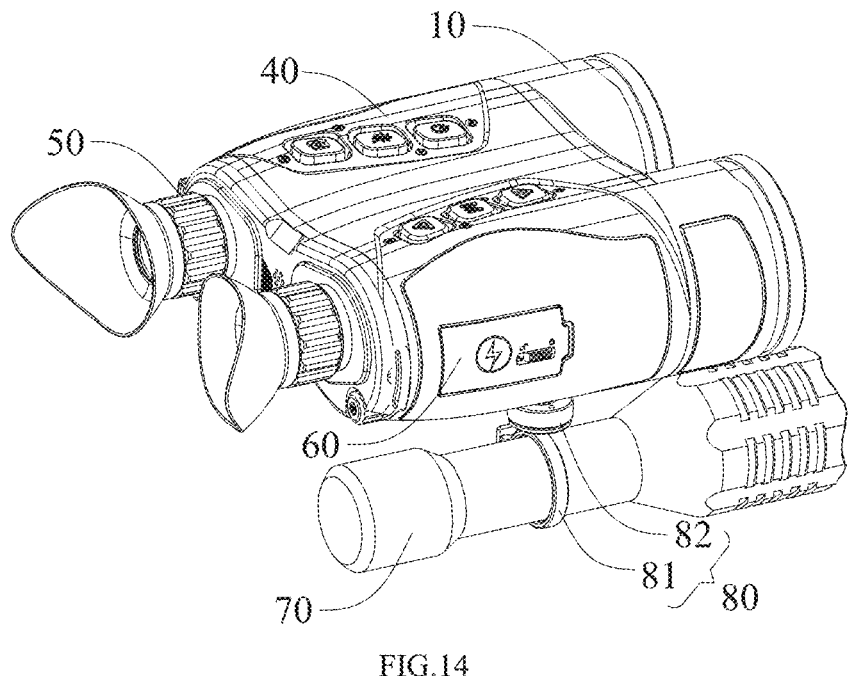
FIG. 14 is a schematic diagram of a stereoscopic view of three-light binoculars in another embodiment of the present application.
Figure 15:
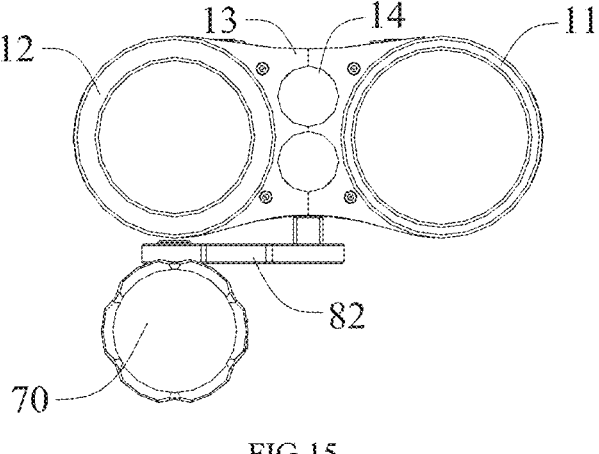
FIG. 15 is a schematic diagram of the rear view of the three-light binoculars in FIG. 14.

To improve color imaging performance in nighttime of the three-light binoculars 100, the illumination can be enhanced by adding an infrared light source. Specifically, as shown in FIG. 14 and FIG. 15, an infrared flashlight 70 can be detachably mounted on the housing 40 of the three-light binoculars 100. The infrared flashlight 70 is mounted to the bottom of the housing 40 via a flashlight mounting bracket 80.

The flashlight mounting bracket 80 includes a clamp 81 and a connecting piece 82. The clamp 81 can be fitted around the periphery of the infrared flashlight 70. The infrared flashlight 70 is fixed to the clamp 81 by tightening the clamp 81. One end of the connecting piece 82 is fixed to the clamp 81, and the other end can be fastened to the bottom of the housing 40 by means of a fastener.

The infrared flashlight 70 can utilize an IR 940 nm flashlight for light supplement, emitting 940 nm infrared lights after being energized. The infrared flashlight 70 is mounted to the bottom of the housing 40 and located below the infrared barrel 12 and the infrared lens 22. When powered on, the infrared flashlight 70 emits 940 nm infrared lights to the target along the direction parallel to the optical axis of the infrared lens 22, enhancing the light illumination during nighttime use. The infrared flashlight 70 is an independent component/accessory that uses its own power supply, not drawing power from the internal battery compartment 60, and does not affect the battery life. Moreover, the infrared flashlight 70 can be detached from the housing 40, not taking up internal space, and can also be removed when not in use to reduce weight.

In situations with insufficient nighttime illumination, the infrared flashlight 70 can be installed to enhance illumination, thereby enabling the observation of clear color images. The infrared flashlight 70 can also be adapted to different scenarios by replacing the infrared flashlight with different power consumptions through self-disassembly and reassembly, thereby adjusting the illumination distance. This improves the effect of color imaging of visible lights at night and ensures the quality of optical imaging.

The working process of the three-light binoculars 100 is as follows. Lights entering from the binocular barrel are focused by the visible-light lens 21 and the infrared lens 22 respectively, and are projected onto the visible light core 23 and the infrared core 24. The visible-light core 23 and the infrared core 24 sense and obtain visible-light images and infrared images. The image data of the visible light images and the infrared images are input to the image processing chip of the system-on-chip board 30 for data processing. The laser rangefinder 25 emits and receives laser through the laser window 14 and the data processing is performed in the laser rangefinder 25 to obtain measurement results. Finally, all the data is output to the display 55 of the eyepiece system 50. The image information and interface information on the display 55 can be seen by human eyes through eyecups of the eyepiece system 50.

During use, the focusing mechanisms 27 can adjust focusing of visible light imaging and focusing of infrared imaging separately. The eyepiece visibility and interpupillary distance of the eyepiece system 50 can be adjusted to optimize the observed image. The infrared flashlight 70 can be installed through the flashlight mounting bracket 80 to enhance visible light imaging effect in poor light conditions.

The present application provides three-light binoculars that integrates visible-light imaging, high-sensitivity infrared thermal imaging and laser ranging, and can be used as a portable handheld telescope of binocular three-light suitable for all scenarios such as outdoor exploration, hunting, field safety protection and etc.

The three-light binoculars of the present application have functions of manual focusing for both visible-light lens and infrared lens. Focusing is achieved by adjusting the relative positions of the core (visible-light core, infrared core) and the lens (visible-light lens, infrared lens). By rotating the knob with a finger, the focusing screw rotates simultaneously. The rotation of the focusing screw drives the lens flange and the core to move relative to the lens, thereby achieving focusing. By canceling lens focusing from the internal, the lens structure is simplified, and the weight is reduced. The entire functional structure does not require additional space in the overall machine. The positions requiring sealing in the functional mechanism can be achieved with ordinary sealing rings. During use, focusing can be completed with a single finger, which is very convenient.

The three-light binoculars of the present application have function of adjusting pupil distance. By fixing the eyepiece to the eyepiece flange and adding a guide block, the pupil distance can be adjusted. The pupil distance adjustment can be achieved by adjusting the tightness through the guide block and the grip ring. The structure is simple for assembling, does not require screw fastening, and does not have complex parts. The overall shape of the three-light binoculars is not restricted, allowing for different designs without affecting the internal spatial layout. This provides more space to add other functional components. By installing a sealing ring on the eyepiece flange, the entire product can be sealed, providing a high sealing level.

The three-light binoculars of the present application have functions of day and night dual-use. It utilizes a dual-bandpass filter to replace the IR-CUT dual filter switcher. In the daytime mode, the image processing module filters out infrared lights to obtain a clearer image. In the nighttime mode, infrared lights can be sensed to obtain lower illumination. It features high cost-effectiveness, small size, simple structure, and high stability. It can enhance the effect of nighttime color imaging and ensure optical imaging quality. To further enhance nighttime color imaging, an infrared flashlight can be used simultaneously to enhance light intensity. Image processing algorithms can be further used to optimize the visible-light imaging effect, improving the visible-light nighttime color imaging effect and ensuring optical imaging quality.

It should be noted that in this document, the term "comprising," "including," or any other variation thereof, is intended to be non-exclusive, so that a process, method, article, or apparatus comprise listed elements, and does not exclude other elements not expressly listed, or elements that are intrinsic to such process, method, article, or apparatus. In the absence of further limitations, the element defined by the phrase "comprising a . . . " does not exclude the presence of other identical elements in the process, method, article, or apparatus comprising that element.

The above description are only specific embodiments of the present invention. However, the scope of protection of the present invention is not limited thereto. Any person skilled in the art can easily conceive variations or substitutions within the technical scope disclosed in the present invention, all of which should be encompassed within the scope of protection of the present invention. The scope of protection of the present invention should be determined according to the appended claims.

What is claimed is:

1. Three-light binoculars, characterized by comprising:
   a binocular barrel, including a visible-light barrel, an infrared barrel, and a laser window;
   a core assembly, including a visible-light core assembly, an infrared core assembly, and a laser rangefinder, the visible-light core assembly receiving visible-lights through the visible-light barrel and generating visible-light images, the infrared core assembly receiving infrared light through the infrared barrel and generating infrared images, the laser rangefinder receiving laser through the laser window and obtaining ranging results by calculation;
   a system-on-chip board, connected to the visible-light core assembly, the infrared core assembly, and the laser rangefinder respectively, for processing and fusing the visible-light images and the infrared images, and receiving the ranging results;
   a housing, connected to the binocular barrel at its front end and to an eyepiece system at its rear end, forming a space for accommodating the core assembly and the system-on-chip board; and
   the eyepiece system, including two eyepieces, each of which is provided with a display in signal connection to the system-on-chip board;
   wherein the visible-light barrel and the infrared barrel are connected by a connecting plate;
   the visible-light core assembly comprises a visible-light lens and a visible-light core, the visible-light lens corresponds to the visible-light barrel, the visible-light core senses lights projected by the visible-light lens and generates visible-light images; the infrared core assembly comprises an infrared lens and an infrared core, the infrared lens corresponds to the infrared barrel, the infrared core senses lights projected by the infrared lens and generates infrared images;
   the core assembly comprises a lens bracket, the lens bracket is fixed in the housing parallel to the connecting plate, the visible-light core and the infrared core are respectively mounted to the lens bracket through a focusing mechanism, and the laser rangefinder is mounted on the lens bracket between the visible-light lens and the infrared lens, so that laser emitted by the laser rangefinder is directed towards the laser window.

2. The three-light binoculars of claim 1, wherein at least one of a battery compartment board, a display power-supply board, a key board, a microphone board, a GPS module, an electronic compass, a WiFi module, and a debugging interface board, is integrated on the system-on-chip board; the system-on-chip board outputs comprehensive images, which are superpositions of the laser ranging results with visible-light images, infrared images, or fused images to the display for display; menus and software functions are further superimposed on the system-on-chip board with the comprehensive images to be output to the display for display; a battery compartment detachably installed with batteries is mounted to a side of the housing adjacent to the infrared barrel, and the battery compartment board connects to the battery compartment to control the charging and discharging of the battery compartment.

3. The three-light binoculars of claim 1, wherein gripping areas in a C-shaped curve are respectively provided on two sides of the housing, and a key area is provided on the housing between the two gripping areas.

4. The three-light binoculars of claim 1, wherein the focusing mechanism comprises a focusing screw, a focusing screw bracket and a lens flange; the focusing screw is arranged parallel to an corresponding optical axis, the visible-light core and the infrared core are respectively fixedly connected to the corresponding lens flanges, one end of the focusing screw bracket is fixedly connected to the lens bracket, and the other end is rotatably connected to the focusing screw; and the lens flange is threadedly connected to an end of the focusing screw, so that when the focusing screw rotates, the lens flange can move relative to the visible-light lens or the infrared lens along the corresponding optical axis.

5. The three-light binoculars of claim 4, wherein the focusing mechanism comprises an anti-backlash spring, the lens flange is provided with a threaded hole corresponding to the focusing screw, the anti-backlash spring is placed in the threaded hole, and the end of the focusing screw is in contact with the anti-backlash spring.

6. The three-light binoculars of claim 4, wherein the focusing screw bracket is connected to a diameter-reduced portion of the focusing screw, and a snap ring stuck at the diameter-reduced portion is respectively installed to both ends of connection of the focusing screw bracket to the focusing screw, so as to constrain an axial position of the focusing screw at the connection to the focusing screw bracket.

7. The three-light binoculars of claim 4, wherein a positioning guide groove is defined on the lens flange along the corresponding optical axis, and a positioning pin respectively protrudes from the corresponding barrel of the visible-light lens and the infrared lens, and the positioning pins are limited within the corresponding positioning guide groove, so as to allow the lens flanges to move relative to the corresponding lens barrel along the corresponding optical axis.

8. The three-light binoculars of claim 1, wherein the visible-light lens comprises lenses and a dual-bandpass filter, the dual-bandpass filter allows lights of a first bandwidth and a second bandwidth to pass through, the first band is the visible-light bandwidth and the second band is the infrared light bandwidth; and the visible-light core comprises an image sensor and an image processing module, the image processing module being connected to the image sensor to receive image signals sensed by the image sensor; wherein the three-light binoculars provide a daytime mode and a nighttime mode; in the daytime mode, the image processing module filters images of the second bandwidth lights from the image signals of the image sensor, retaining images of the first bandwidth lights; and in the nighttime mode, the image processing module retains both images of the first bandwidth lights and images of the second bandwidth lights.

9. The three-light binoculars of claim 8, wherein the first bandwidth is in 420~660 nm, the second bandwidth is in 930~970 nm; the dual-bandpass filter has a transmittance of more than 50% for lights of the first bandwidth and a transmittance of more than 85% for lights of the second bandwidth.

10. The three-light binoculars of claim 8, wherein the daytime mode or the nighttime mode is determined by the image processing module on change of light brightness senses by a light sensor, and images of the second bandwidth lights in the image signals received from the image sensor is filtered in the daytime mode.

11. The three-light binoculars of claim 8, wherein an infrared flashlight is detachably mounted to the bottom of the housing, the infrared flashlight is directly below the infrared lens after being mounted to the housing, and the infrared flashlight emits infrared lights parallel to the optical axis of the infrared lens after being energized.

12. The three-light binoculars of claim 11, wherein the infrared flashlight is provided with a battery inside, and a 940 nm infrared-light emitting diode is adopted by the infrared flashlight.

13. The three-light binoculars of claim 11, wherein the infrared flashlight is mounted to the housing via a flashlight mounting bracket, the flashlight mounting bracket comprising a clamp and a connecting piece, the clamp being sleeved on periphery of the infrared flashlight, the connecting piece being fixed at one end to the clamp and being locked to the housing at the other end by a fastener.

14. The three-light binoculars of claim 1, wherein the eyepiece system comprises a rear shell, the rear shell is provided with two eyepiece openings, each of the eyepieces is fixed in the corresponding eyepiece opening on the rear shell from the outside by an eyepiece flange, and each of the displays is fixed to the corresponding eyepiece flange.

15. The three-light binoculars of claim 14, wherein the eyepiece system comprises grip rings, the grip ring is connected to the inner side of the corresponding eyepiece flange by threads, and tightness between the eyepiece flange and the eyepiece opening is adjusted by adjusting a mounting position of the grip ring on the eyepiece flange.

16. The three-light binoculars of claim 15, wherein the eyepiece system comprises a guiding block, the guiding block defines a guiding opening with the same shape as the eyepiece opening, the guiding block is disposed in the eyepiece opening; the eyepiece flange extends outward circumferentially to form a baffle, the baffle is larger than the eyepiece opening and abuts against outer side of the rear shell to block the eyepiece opening from the outside and constrain the position of the eyepiece flange; the eyepiece flange is provided with a connecting end, the connecting end passes through the eyepiece opening and the guiding opening threadedly connecting to the grip ring, and the rear end surface of the grip ring is in contact with the corresponding front end surface of the guiding block.

17. The three-light binoculars of claim 16, wherein the guiding block is made of self-lubricating wear-resistant material, and the side wall of the grip ring is provided with a locking opening, so that a locking pin can be inserted into the locking opening and abut against wall of the connecting end.

18. The three-light binoculars of claim 14, wherein the outer side of the rear shell is provided with scale marks, the scale marks are located between the eyepiece openings, and adjacent scale lines of the scale mark are equally spaced, to indicate moving distances of the eyepiece flange and the eyepiece relative to the rear shell.

\* \* \* \* \*